Sept. 24, 1935.  J. EDGAR  2,015,068
CUTTER
Original Filed July 9, 1923
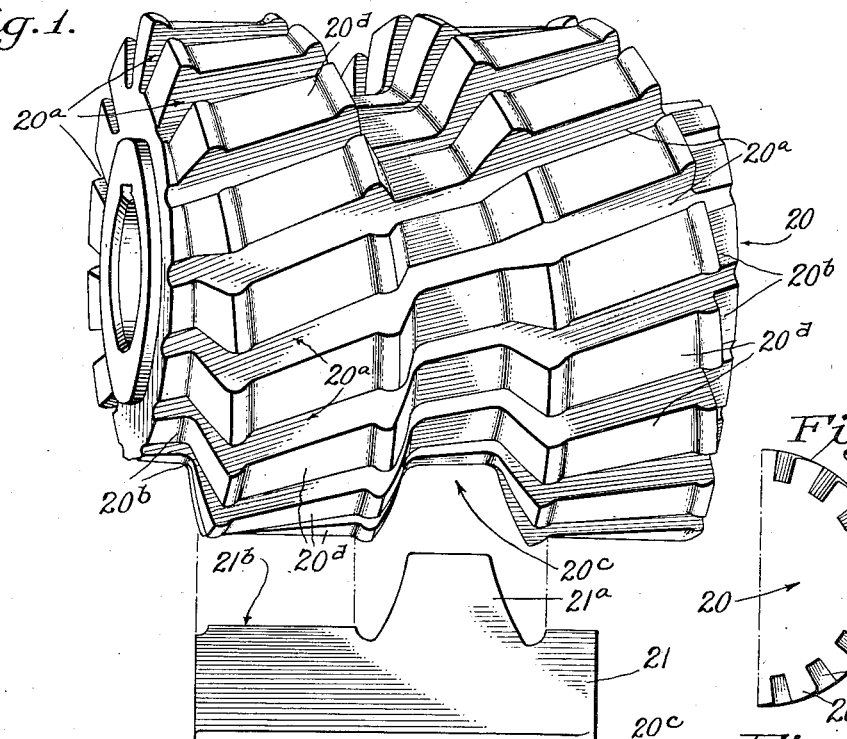
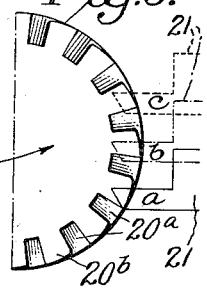
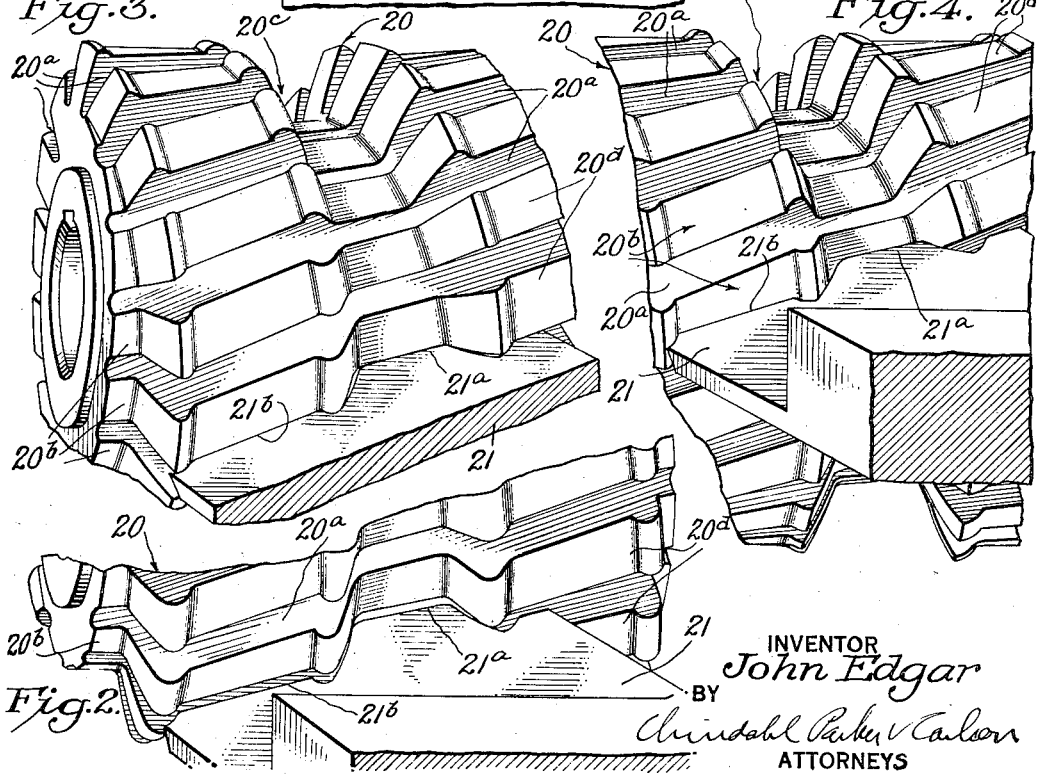
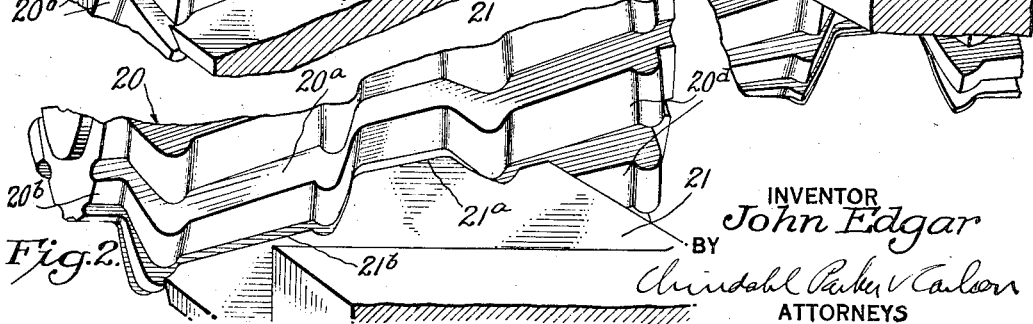
INVENTOR
John Edgar
BY
ATTORNEYS Patented Sept. 24, 1935

2,015,068

UNITED STATES PATENT OFFICE 2,015,068

CUTTER

John Edgar, Rockford, Ill., assignor to Barber-Colman Company, Rockford, Ill., a corporation of Illinois Original application July 9, 1928, Serial No. 291,161. Divided and this application November 7, 1930, Serial No. 493,936

9 Claims. (Cl. 29—103)

The invention relates generally to cutters and more particularly to an improved cutter of the hob type. This application is a division of my application Serial No. 291,161, filed July 9, 1928, (Patent No. 1,809,377) wherein the present invention was disclosed in connection with a machine and method for making the improved cutter.

The general object of the invention is to provide a new and improved cutter embodying teeth which have a generated form.

Another object is to provide a new and improved cutter of the hob type having generated teeth so that all corresponding points on successive tooth edges are formed in helical lines about the circumference and which, when unwrapped from cylindrical position onto a plane are identical in shape to the form on the tool used to generate the teeth.

On spiral gashed hobs the various points on the teeth do not lie in radial planes due to the fact that the hobs have teeth which are identical to the teeth on straight gashed hobs, but which are turned to the spiral or helical angle. This condition causes part of the form to lie above the axial plane and the remainder below said plane, there being only one point in the form which is in an axial plane. This condition renders it difficult to obtain accurate work from spiral gashed hobs, it being especially noticeable when the hobs are employed in making spline shafts wherein the space between the hob teeth is large due to the fact that the flutes in the spline shafts are wide. Prior art spiral gashed hobs which were used to produce spline shafts having exceptionally wide flutes produced errors of form which the present invention eliminates.

It is another object of the invention to provide an improved hob having generated teeth so that all points on the teeth lie in radial planes and accurate cutting conditions are obtained.

Other objects and advantages will become apparent from the following detailed description taken in connection with the accompanying drawing, in which:

Figure 1 is a plan view of one form of a spline shaft hob embodying the present invention, together with the lathe tool used in forming and relieving the hob, the hob and lathe tool being shown in spaced relation.

Fig. 2 is a fragmentary perspective view of the hob with the lathe tool positioned at the start of the generating operation.

Fig. 3 is a view similar to Fig. 2, but showing the position of the lathe tool at an intermediate stage of the generating operation.

Fig. 4 is a view similar to Fig. 2, but showing the lathe tool at the end of the generating operation.

Fig. 5 is a diagrammatic view taken endwise of the hob blank illustrating the generating action resulting from elevating the lathe tool through the horizontal axial plane of the blank.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The exemplary embodiment of my invention illustrated in the drawing discloses a spiral gashed spline shaft hob 20. The hob is formed with a plurality of equally spaced and longitudinally inclined flutes or gashes 20$^a$ defining a plurality of generally longitudinal blades 20$^b$, and with a single spiral groove 20$^c$ intersecting the gashes 20$^a$ at a large lead to define a thread of a plurality of hob teeth 20$^d$. It will be understood that while but a single thread is shown, the hob may be formed with any desired number of threads, i. e., may be a single or a multiple thread hob. The entire contour of the hob is formed by a molding-generating process to be more fully described hereinafter, and hence all points along the contour are correctly formed and relieved.

A lathe tool 21, having the desired form, is used for cutting the hob blank. In the present instance the lathe tool 21 has a predetermined contour comprising a section 21$^a$ adapted to generate the groove 20$^c$ and a section 21$^b$ adapted to generate the top of the hob teeth 20$^d$. The upper face of the tool 21 is inclined longitudinally of the hob at an angle corresponding to that of the gashes 20$^a$.

In producing the hob 20, the hob blank is mounted on a suitable shaft and is rotated at a predetermined speed in a given direction and the lathe tool 21 is reciprocated laterally of the blank, once for each tooth, to spirally relieve the latter. With reference to the illustrative example shown in the drawing, such lateral reciprocation of the lathe tool is horizontally inward. At the same time, the lathe tool is traversed longitudinally of the work blank in timed relation to the rotation thereof to generate the hob thread 20$^d$. Such traversing movement may be termed a cutting stroke. For the operation thus far, the lathe tool is preferably positioned, in the present instance, so that one point on its cutting contour lies in a horizontal axial plane, the particular point herein shown being at the right end of the lathe tool. The rest of the cutting contour of the lathe tool is farther from the axis of the hob, since the face of the lathe tool is inclined vertically relative to the hob axis at an angle corresponding to that of the gashes 20ª in the hob.

When one cutting stroke has been completed, that is, one traversing movement of the lathe tool, from right to left in the present instance, the lathe tool and hob blank are separated by a movement of the lathe tool laterally outward of the blank. The direction of rotation of the hob blank and the direction of traverse of the lathe tool are then reversed, although maintained at the same relative speed, so that the lathe tool is returned in a free, non-cutting stroke to its initial position. At this point in the operation, the lathe tool is fed inwardly, in the present instance horizontally, into the hob blank by a suitable increment beyond the position of the preceding cutting stroke, and the foregoing cycle is repeated. Such feeding and repetition of the cutting stroke, once for each increment, is continued until the blank is cut to the desired depth.

The result of the operation thus far is that the above-mentioned point on the contour of the lathe tool, which lies in an axial plane of the hob, has cut a point on each tooth of the hob, together with the proper relief therefor, which is correct for the finished contour of the hob teeth. The remainder of said finished contour, however, is still to be completed, since the portion of the lathe tool contour which cuts said remainder has not been moved into the horizontal axial plane, thus leaving metal thereon still to be removed. Such result is illustrated in Fig. 2.

To remove the remainder of the metal and thus complete the contour of the hob teeth, the tool is gradually moved tangentially of the hob without further radial feeding movement. In the present instance, said tangential movement is vertical and, since the right-hand end of the lathe tool was in the axial plane, the movement is upward. As shown in the drawing, the tool is moved from the position shown in Fig. 2, through the position shown in Fig. 3, to the position shown in Fig. 4, the three positions being illustrated diagrammatically in Fig. 5 by the letters a, b and c.

The effect of such gradual tangential movement is to progressively move the portions of the contour of the lathe tool into an axial plane so that the entire contour of the hob may be correctly brought to size. However, certain compensations have to be made because of the fact that the point of the contour of the lathe tool which lies in the axial plane has moved from right to left, in the present instance, and hence meets the point on the hob which it is to finish to size sooner than before. These compensations are made in the reciprocation for cutting the relief and in the rate of longitudinal traverse of the lathe tool, and because the lathe tool is moved upwardly, the relieving reciprocation and the rate of traverse are both advanced. Since the upward movement of the lathe tool is constant, although gradual, the advance in these two factors is constant and gradual.

It will be noted that, since the hob has a rotary movement of a predetermined rate and the lathe tool has a linear reciprocation toward the hob in timed relation to the rotary movement of the hob, the effect of such linear reciprocation upon the hob varies with the different diameters of the hob at which the tool acts. Thus, the effect of cutting relief at a high point on a tooth differs from the effect of cutting relief at a lower point, so that the contour of a tooth at a line rearwardly of the original face contour of the tooth differs from said original face contour. However, both contours will produce the same effect upon a work piece since they are made by the same lathe tool. Thus, while the said rearward contour and the said original contour are different in shape, the conjugate contours of both are the same. Such rearward contour on the tooth is one which is obtained when the hob is sharpened by grinding off the face of the tooth. It is therefore clear that sharpening the hob does not alter the shape obtained on a work piece from that obtained by the original cutting contour.

The hob is formed and relieved in a molding-generating operation, and when completed has a generated contour. The inclined cutting edges of the cutter or hob are so formed that like points in successive edges are formed in helical lines about the circumference which, when unwrapped, will define a generated form of involute complementary to the form on the tool used to generate the hob. The hob thus will be correctly formed throughout the entire contour.

I claim as my invention:

1. A rotary cutter having a plurality of longitudinal spiral gashes and a fully generated helical groove intersecting said gashes to form a thread of substantial lead comprising a plurality of uniformly-shaped fully generated teeth conjugate to the form to be produced thereby, the cutting edges of said teeth being spirally relieved in a manner compensating for differences of diameter so that grinding of the faces in different planes will result in changes in shape but will not alter the conjugate contour thereof.

2. A cutter having a plurality of longitudinally extending relieved blades, each of said blades having a contour other than a straight line, the contour being helical about the cutter and having a generated form in any radial plane conjugate to the form to be reproduced thereby, the generated form varying in different radial planes.

3. A cutter having a helical thread of teeth, said teeth being relieved and being arranged in rows inclined longitudinally of the cutter, like points in successive edges of the thread of teeth being formed in helical lines about the circumference so that when said cutting edges are unwrapped from a cylindrical position onto a plane they are identical in shape to a form generated in a plane from a predetermined tooth shape.

4. A generated cutter of the hob type having a plurality of longitudinal gashes and one or more generated helical grooves intersecting said gashes to form one or more threads comprising a plurality of radially relieved generated teeth conjugate to the form to be produced thereby so that during successive sharpenings by grinding the radial faces of the teeth the tooth contour will vary as the diameter varies but will remain conjugate to the predetermined shape.

5. A cylindrical cutter having a plurality of circumferential teeth having lead, said teeth having both a uniform top relief and a uniform side relief, said teeth being set forth by means of a plurality of identically similar helical grooves lying longitudinally in the surface of said cutter and helical grooves transversely intersecting the said first mentioned grooves substantially at right angles, said last mentioned helical grooves having a generated contour of identical form in equally spaced radial planes of a number corresponding to the number of said longitudinal grooves and of a different but conjugate form in any other series of equally spaced radial planes equidistant from the first mentioned radial planes.

6. A cylindrical cutter having a plurality of circumferential teeth having lead, said teeth having both a top relief and a side relief, said teeth being set forth by means of a plurality of identically similar grooves lying longitudinally in the surface of said cutter, and a helical groove transversely intersecting said first mentioned grooves, said last mentioned groove having a contour of identical form in equally spaced radial planes of a number corresponding to the number of said longitudinal grooves and of a different but conjugate form in any other series of equally spaced radial planes equidistant from the first mentioned radial planes.

7. A rotary cutter comprising a body formed with a plurality of generally longitudinal gashes and with a peripheral helical groove intersecting said gashes to form a helical series of cutting elements, said groove defining a predetermined cutting contour, said elements being relieved, the shape of said contour being different in different radial planes through each of said elements, but always remaining conjugate to the form to be reproduced.

8. A rotary cutter having a plurality of longitudinal spiral gashes and a helical groove intersecting said gashes to form a thread comprising a plurality of teeth, the cutting edges of said teeth being relieved, the relief of each tooth being similar to the cutting edge but differing therefrom only by the change of shape due to the difference in diameter between the relief and the cutting edge.

9. A rotary cutter of the hob type having a plurality of longitudinal gashes and a helical groove intersecting said gashes to form a thread comprising a plurality of teeth, the contour of said teeth in any helical section lengthwise of the cutter and intersecting the axis being conjugate to the basic rack shape of the hob tool and equivalent to the contour of a tooth generated at a position relative to the theoretical pitch circle as determined by the cutter relief and angular location of the helical section.

JOHN EDGAR.